United States Patent
Fuse (10) Patent No.: US 6,937,327 B2
(45) Date of Patent: Aug. 30, 2005

(54) APPARATUS AND METHOD OF MEASURING OPTICAL PROPERTIES OF DIFFRACTIVE OPTICAL ELEMENT

(75) Inventor: Keiji Fuse, Osaka (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 363 days.

(21) Appl. No.: 10/340,620

(22) Filed: Jan. 13, 2003

(65) Prior Publication Data

US 2003/0137656 A1 Jul. 24, 2003

(30) Foreign Application Priority Data

Jan. 16, 2002 (JP) .................................. 2002/007599

(51) Int. Cl.[7] ................................................ G01B 9/00
(52) U.S. Cl. ...................................... 356/124; 356/636
(58) Field of Search ........................ 356/72, 124, 125, 356/218, 229, 636; 430/5, 22, 30; 355/53, 55

(56) References Cited

U.S. PATENT DOCUMENTS

| | | | | |
|---|---|---|---|---|
| 3,829,219 A | * | 8/1974 | Wyant ........................ | 356/124 |
| 3,930,732 A | * | 1/1976 | Holly ........................ | 356/124 |
| 4,275,964 A | * | 6/1981 | Vassiliadis .................. | 356/125 |
| 4,641,961 A | * | 2/1987 | Yamada ...................... | 356/124 |
| 4,672,196 A | * | 6/1987 | Canino ....................... | 250/225 |
| 4,828,385 A | | 5/1989 | Fukuma et al. | |
| 5,113,286 A | * | 5/1992 | Morrison .................... | 359/569 |
| 5,198,867 A | * | 3/1993 | Campbell .................... | 356/125 |
| 5,620,818 A | * | 4/1997 | Yuan .............................. | 430/5 |
| 6,097,488 A | * | 8/2000 | Grek et al. .................. | 356/364 |
| 6,195,169 B1 | * | 2/2001 | Naulleau et al. ............. | 356/498 |
| 6,538,749 B1 | * | 3/2003 | Takata et al. ................ | 356/520 |
| 6,573,997 B1 | * | 6/2003 | Goldberg et al. ............ | 356/521 |
| 2002/0051564 A1 | * | 5/2002 | Benesch et al. ............ | 382/145 |

FOREIGN PATENT DOCUMENTS

| | | |
|---|---|---|
| EP | 0 676 629 A2 | 10/1995 |
| EP | 1 136 806 A2 | 9/2001 |
| JP | 6-58841 | 3/1994 |
| JP | 9-196813 A | 7/1997 |
| JP | 2000-288761 A | 10/2000 |

OTHER PUBLICATIONS

"Optical Properties of ZnSe Diffractive Optical Elements for Spot Array Generation" Keiji Fuse, et al. *SEI Technical Review* No. 48 (Jun. 1999) pp. 69–78.

"High Speed Binary Optic Microlens Array in GaAs" M.E. Motamedi et al. *SPIE* Vo. 1544 *Miniature and Micro–Optics: Fabrication and System Applications* (1991) pp. 33–44.

"Diffractive Element in Optical Inspection of Paper" Raimo Silvernnoinen, et al. Society of Photo–Optical Instrumentation Engineers 37(5) (May 1998) pp. 1482–1487.

* cited by examiner

Primary Examiner—Michael P. Stafira
Assistant Examiner—Juan D Valentin
(74) Attorney, Agent, or Firm—McDermott Will & Emery LLP (57) ABSTRACT

A laser beam emitted from a laser source is split by a beam-splitting means such as a beam sampler, and the power Q of the split beam is measured by a first detector. In addition, the power $q_1$ of light that has passed through a pinhole while a DOE is not set is measured by a second detector, and the power ratio $\alpha = q_1/Q$ is calculated. Then, the DOE is set and the power ratio $\beta_k = q_k/Q$, where $q_k$ is the power of each light beam, is calculated. The power ratio $\beta_k$ is evaluated on the basis of the power ratio $\alpha$, so the optical properties of a diffractive optical element, in particular, in terms of diffraction efficiency in laser-beam diffraction and intensity uniformity of split beams can be measured with high accuracy.

10 Claims, 10 Drawing Sheets

APPARATUS AND METHOD OF MEASURING OPTICAL PROPERTIES OF DIFFRACTIVE OPTICAL ELEMENT

BACKGROUND OF THE INVENTION

1. Field of the Invention

The present invention relates to an apparatus and a method of measuring optical properties of a Fresnel lens, a hybrid lens, a diffractive beam splitter, etc. (hereinafter referred to generically as diffractive optical elements (DOEs)) with high accuracy, in particular, in terms of diffraction efficiency in laser-beam diffraction and intensity uniformity of split beams.

2. Description of the Related Art

In the development of DOEs used in laser processing systems which perform, for example, multipoint simultaneous drilling, it is necessary to accurately evaluate optical properties such as diffraction efficiency and intensity uniformity of split beams of the DOEs, which affect the performance of the processing systems. A known method for evaluating the optical properties will be described below with reference to FIG. 9.

Figure 9:
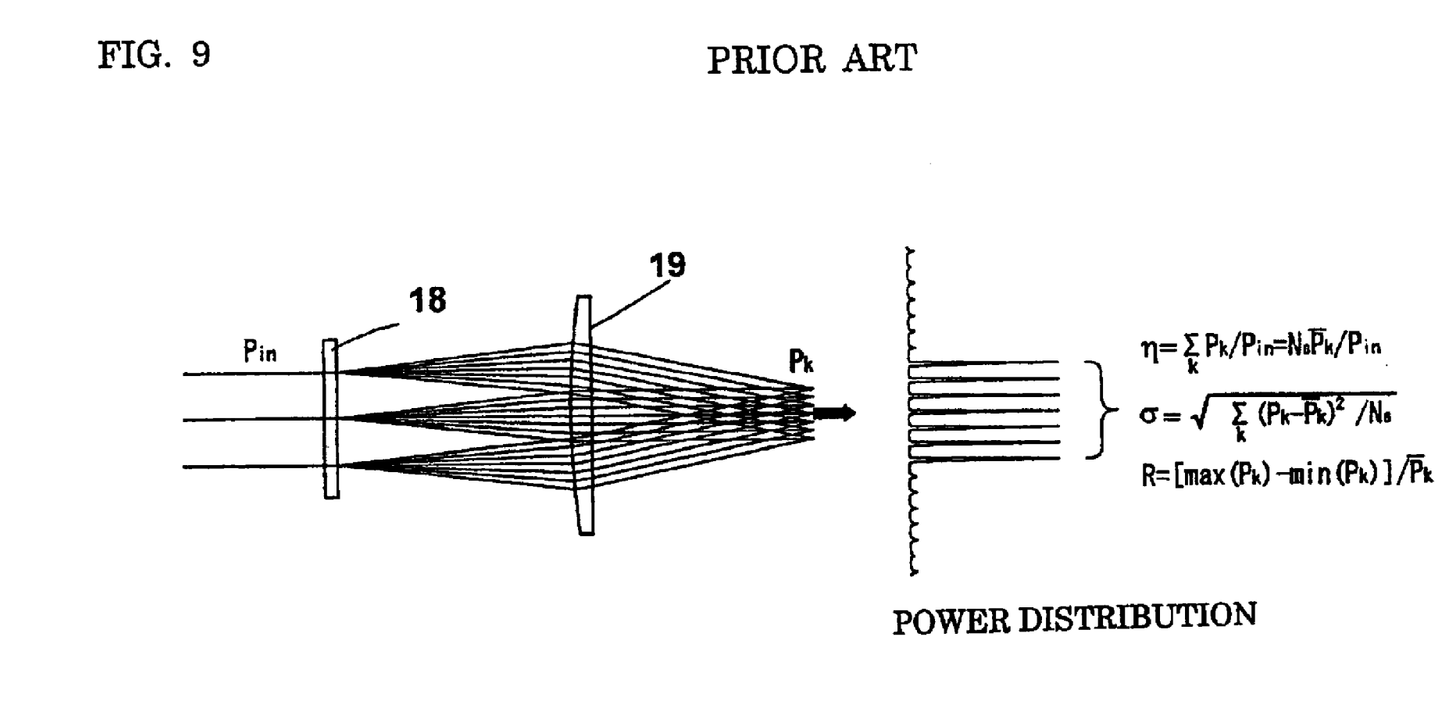
FIG. 9 is a diagram showing a known evaluation method.

A laser beam having a power of $P_{in}$ is incident on a DOE 18, which is a test piece, and is split into multiple beams (seven in FIG. 9). The split beams are converged on an image plane at corresponding positions by a lens 19. The diffraction efficiency is defined as the ratio of the sum of the power $P_k$ of each split beam to the incidence power $P_{in}$. The diffraction efficiency represents the energy utilization efficiency in the use of the DOE 18.

Normally, the ratio is 0.6 to 0.9 (the diffraction efficiency is 60% to 90%), and the rest 1−η indicates a loss dissipated to the environment as noise. Uniformity of the power $P_k$ of split beams is expressed by the standard deviation σ or the maximum-minimum range R. Equations for calculating the diffraction efficiency η, the standard deviation σ, and the maximum-minimum range R are shown in FIG. 9. In the equations, $N_S$ indicates the number of beams into which the laser beam is split (hereinafter referred to as a splitting number), and $\overline{P}_k$ indicates the average of $P_k$.

According to the above-described definitions, the diffraction efficiency and the intensity uniformity of the split beams can be calculated if the power $P_{in}$ of the incident laser is measured with a power meter and the power $P_k$ of each split beam is measured at each focus point where a pinhole aperture of a suitable size is set.

However, the above-described evaluating method has the following problems with regard to the measurement accuracy:

(a) The measurement accuracy depends on the accuracy of power meters.

In order to measure the diffraction efficiency with high accuracy, the power $P_{in}$ of the incident beam and the power $P_k$ of each split beam must be measured with high absolute accuracy. For example, when the splitting number of the laser beam is large, such as over a hundred, $P_k$ is smaller than $P_{in}$ by two orders of magnitude or more. Therefore, the absolute accuracy of the power meter is extremely important. In addition, the repetition accuracy is important for measurement of the intensity uniformity of the split beams. However, the absolute accuracy of commercial power meters is normally ±3% to ±5%, and is not sufficient.

(b) Power stability of the laser beam greatly affects the measurement accuracy.

When the laser power is unstable, measurement values of $P_{in}$ and $P_k$ vary and the measurement accuracy decreases. The power stability of commercial carbon dioxide lasers is normally ±5% to ±10%, and is also not sufficient.

(c) The size of the pinhole for allowing the split beams to pass therethrough affects the measurement results.

In order to accurately measure the power $P_k$ of each split beam, the pinhole size must be optimized. However, since the intensity distribution is widely spread with very low intensity side lobes at each spot, it is extremely difficult to determine the pinhole size. If the pinhole size is too small, the power cannot be sufficiently collected and $P_k$ will be smaller than the actual value, and if the pinhole size is too large, environmental noise and the power of the neighboring split beams will be collected and $P_k$ will be larger than the actual value. Thus, the measurement results vary in accordance with the pinhole size, and sufficient reliability cannot be obtained.

(d) The quality of the laser beam greatly affects the measurement accuracy.

If the size of the focal spots increases because of the transverse mode characteristics and the wavefront aberration of the laser beam and the shape of the focal spots is distorted, it becomes increasingly difficult to determine the pinhole size.

(e) Characteristics of a lens included in the measurement system greatly affect the measurement accuracy.

The power $P_k$ of each split beam is affected by the transmittance of a lens used. When the transmittance decreases, the measured diffraction efficiency decreases accordingly. In addition, the aberration of the lens also distorts the focal spots similarly as the laser quality does. Since off-axis aberrations depend on the incidence angle of the beam onto the lens, the value of $P_k$ decreases as the splitting number increases and the incidence angle increases accordingly.

SUMMARY OF THE INVENTION

An object of the present invention is to provide an apparatus for measuring optical properties of a DOE in which the above-described problems can be solved to achieve a high-accuracy measurement.

According to the present invention, an apparatus for measuring optical properties of a DOE includes a laser source which emits a laser beam; a beam-splitting means of splitting the laser beam into a main beam and a reference beam; a first measuring means of measuring the power or the energy of the reference beam; a DOE (test piece) which splits the main beam into a plurality of split beams; a mask which allows one of the split beams to pass therethrough; a mask-moving means of moving the mask along at least two axial directions in a plane perpendicular to an optical axis; a second measuring means of measuring the power or the energy of the split beam which passes through the mask; and a calculating means of calculating the ratio of the power or the energy measured by the first measuring means to the power or the energy measured by the second measuring means.

The measurement apparatus may further include a converging lens which is disposed in the rear of the DOE (test piece). According to the DOE, the DOE (test piece) may be placed at the front focal point of the converging lens. The converging lens may be, for example, an fsinθ lens or a single lens.

According to the present invention, optical properties of the DOE (test piece) are measured by using the above-described apparatus by the following two steps:

First step: A power ratio $\alpha = q_1/Q$ is calculated without disposing the DOE. Q is the power of the incident laser beam and measured by the first measuring means, and $q_1$ is the power of the light that has passed through the mask and it is measured by the second measuring means.

Second step: The DOE is set, and a power ratio $\beta_k = q_k/Q$ beam is calculated for each split beam. $q_k$ is the power of each of the split beams which are split by the DOE.

The intensity of each split beam, the diffraction efficiency of the DOE, and the intensity uniformity of split beams are calculated on the basis of the power ratios $\alpha$ and $\beta_k$.

In the first and second steps, the ratio of the energy of the incident laser beam to that of the light that has passed through the mask may be obtained by measuring them instead of calculating the power ratio.

The converging lens may be unnecessary depending on the DOE (test piece). In the case in which the converging lens is not used, a reference lens having the same focal length as that of the DOE is set in place of the DOE, and the power or the energy of light split by the reference lens may be measured by the second measuring means.

Alternatively, the optical properties of the DOE (test piece) may also be measured by the following steps:

First step: A reflective mirror is disposed in front of the converging lens in place of the test piece. Then, while changing the incidence angle $\theta$ of the laser beam incident on the converging lens with the reflective mirror, the dependency $\alpha(\theta) = q_1/Q$ of the power ratio on the incidence angle $\theta$ of the laser beam is measured, where Q is the power measured by the first measuring means and $q_1$ is the power measured by the second measuring means, and a correction factor $\gamma(\theta) = \alpha(\theta)/\alpha(0)$ is obtained by normalizing the measured dependency $\alpha(\theta)$ with $\alpha(0)$;

Second step: The power ratio $\alpha = q_1/Q$ in the state in which the test piece is not set or a reference lens having the same focal length as that of the test piece is set in place of the test piece is calculated.

Third step: The test piece is set and a power ratio $\beta_k = q_k/Q$ is measured for each split beam in the state in which the test piece is set, where $q_k$ is the power of each split beam measured by the second measuring means. Then, the power ratio $\beta_k$ is divided by the correction factor $\gamma(\theta_k)$ corresponding to the diffraction angle $\theta_k$ of each split beam to obtain a corrected power ratio $\beta_k' = \beta_k/\gamma(\theta_k)$.

The intensity of each split beam, the diffraction efficiency of the DOE, and the intensity uniformity of split beams are calculated on the basis of the power ratios $\alpha$ and $\beta_k'$.

As described above, according to the measurement apparatus and the measurement method of the present invention, the power ratio $\alpha$, which is intrinsic to the measurement system, is determined as a reference and the power ratio $\beta_k$ or $\beta_k'$ in the state where the DOE is provided is evaluated on the basis of the power ratio $\alpha$. Accordingly, the most important optical properties of the DOE (test piece), i.e. the diffraction efficiency and the intensity uniformity of the split beams, and the positional accuracy of the focal points, can be measured with high accuracy, because the measurement accuracy of the method of the present invention is hardly affected by the accuracies of the power meters, the laser stability, the pinhole size, the quality of the laser, and characteristics of the lens used in the measurement system.

In the case in which the converging lens is provided, the optical properties of DOEs which cannot converge beams to a suitable size at a suitable position can also be evaluated.

In addition, in a apparatus where the DOE is placed at the front focal point of the converging lens, each split beam from the DOE, even which have a large diffraction angle, is converged by the lens and irradiates the pinhole vertically, so the power of each split beam can be measured under more stable conditions, whereby the measurement accuracy increases.

In addition, when the $f\sin\theta$ lens is used as the converging lens, errors due to the lens aberrations are reduced and the positional accuracy of the spots can be improved, and therefore the measurement accuracy can be further improved.

Furthermore, even when the characteristics of the converging lens are dependent on the incidence angle, the influence of the incidence angle on the measurement values can be eliminated through the correction process, and high-accuracy measurement can also be performed in such a case.

DESCRIPTION OF THE PREFERRED EMBODIMENT

Figure 1:
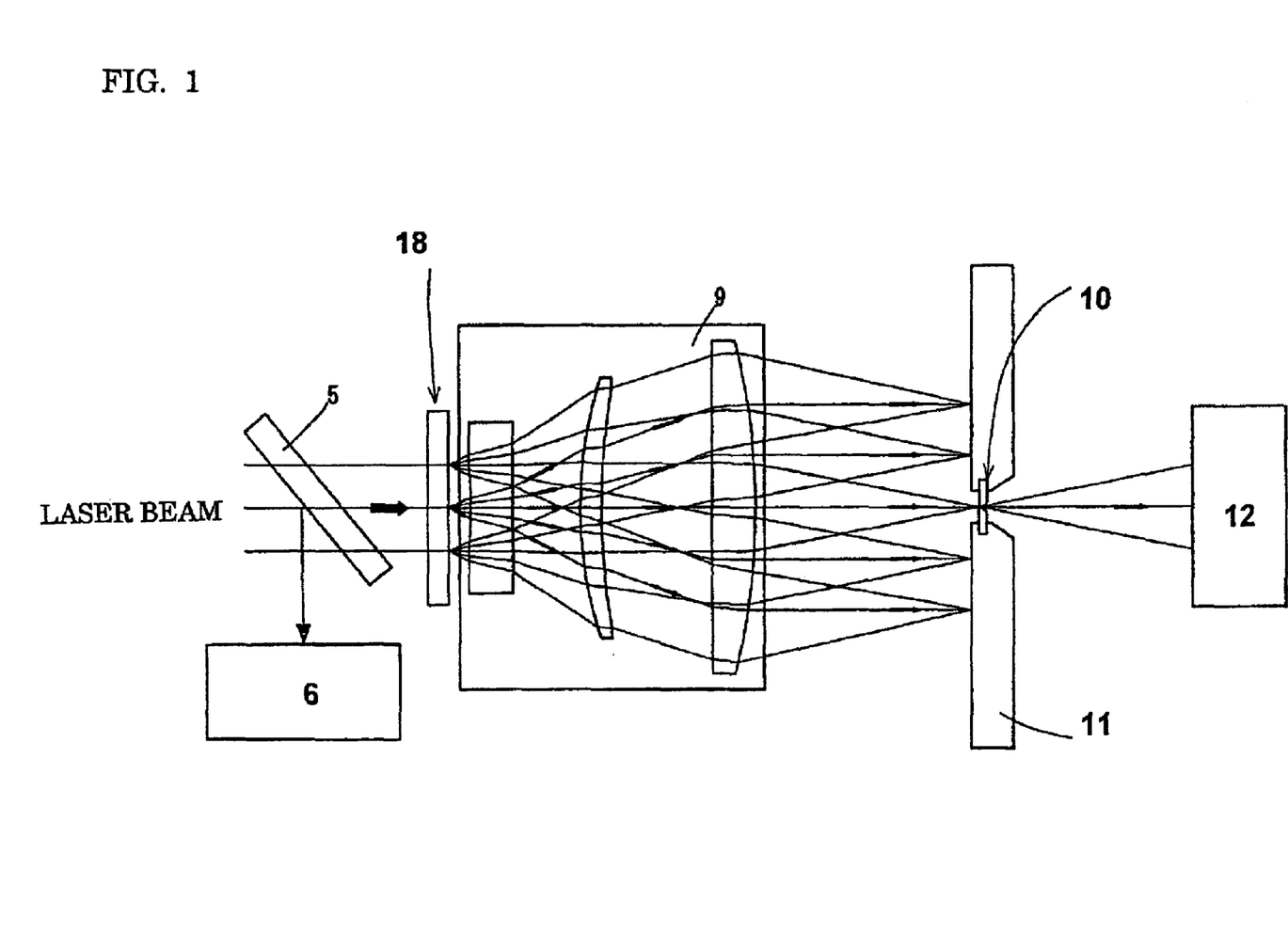
FIG. 1 is a diagram showing the measurement principle of an apparatus and a method according to an embodiment of the present invention.

FIG. 1 is a diagram showing the measurement principle of a method according to an embodiment of the present invention. In the case in which a DOE (test piece) 18 cannot converge beams to a suitable size at a suitable position, for example, when the DOE 18 is a Fourier DOE (whose focal length is infinitely large), a Fresnel DOE having a negative focal length, or a Fresnel DOE having a positive, but long focal length, a converging lens 9 is necessary. However, when the DOE 18 is a Fresnel DOE having a suitable positive focal length, the converging lens 9 may be omitted. Although the lens 9 shown in the figure is an $f\sin\theta$ lens including a plurality of lens elements, a single lens element may also be used.

As shown in the figure, an apparatus is designed such that a part of a laser beam emitted from a laser source is separated by a beam-splitting means 5, such as a beam splitter or a beam sampler, and the power Q thereof is measured by a first detector 6. The apparatus is arranged such that a light beam incident on the DOE 18 is split into multiple beams, and the power $q_k$ of each split beam is measured by the power meter of a second detector 12, through a pinhole (whose diameter is, for example, 50 to 200 µmφ) formed in a mask 10.

The mask 10 can move together with a water-cooled damper 11 in at least two axial directions in a plane perpendicular to an optical axis, so that the power $q_k$ of each split beam can be detected individually by the power meter of the second detector 12.

As a first step, the measurement is performed without the DOE 18, and the ratio α between the power Q measured by the first detector 6 and the power $q_1$ of light having passed through the pinhole in the mask 10 and measured by the second detector 12, is calculated as $\alpha = q_1/Q$.

Then, as a second step, the DOE 18 is set, and the ratio of the power $q_k$ of each split beam to the power Q is calculated as $\beta_k = q_k/Q$.

When the converging lens 9 is used, the DOE 18 is preferably placed at the front focal point of the converging lens 9. In such a case, the system is telecentric on the image side, and the power of each split beam can be measured under stable conditions, since the converged beams enter the pinhole vertically even when the split beams having a large diffraction angle are incident on the converging lens 9 from the DOE 18.

When the power ratios α and $\beta_k$ are calculated, the intensity of each split beam and the diffraction efficiency and the intensity uniformity of the split beams of the DOE 18 can be obtained as follows:

$$P_k = \beta_k / \alpha \tag{1}$$

$$\eta = \sum_k \beta_k / \alpha \tag{2}$$

$$\delta = \sqrt{\sum_k (\beta_k - \overline{\beta_k})^2 / N_S \alpha^2} \tag{3}$$

$$R = [\max(\beta_k) - \min(\beta_k)] \sqrt{\overline{\beta_k}} \tag{4}$$

The above-described measurement method is characterized in that the reference power ratio α is determined at the first step. Although the value of the power ratio α itself has no meaning, it can be considered as an intrinsic value of the measurement system representing the characteristics of all the components including the laser, the beam splitter, the lenses, the pinhole, and the detectors, except for the DOE 18. More specifically, the power ratio $\beta_k$ obtained when the DOE 18 is set, is evaluated on the basis of the power ratio α, which is intrinsic to the measurement system, so that error factors can be eliminated to the extent possible and the properties of the DOE 18 alone can be evaluated.

When the above-described measurement method is applied, the problems described in items (a) to (e) can be solved, or alleviated, as follows:

(a) Accuracy of the power meters: Since the power ratio is measured, it is not necessary that the absolute accuracy of the power meters be high (the repetition accuracy and linearity affect the measurement accuracy). When the splitting number is large, such as over a hundred, the range of power which must be measured by the detectors can be reduced by setting the power of the laser apparatus to a low level in the first step and to a high level in the second step. Accordingly, the linearity error of the power meters would not be a major problem.

(b) Stability of the laser power: Even when the laser power is unstable, the measured power ratio does not change theoretically, so the measurement accuracy does not decrease. Only in the case that the laser power varies faster than the speed of response of the power meter, the measurement accuracy presumably decreases.

(c) Pinhole size: Even when the pinhole size varies, the power ratios α and $\beta_k$ increases/decreases in a constant proportion, the measurement result is minimally affected. The pinhole size can be increased in a range such that noise and the neighboring split beams do not enter therein, and alternatively the size can be reduced to smaller than the focal spot size.

(d) Quality of the laser: Even when the size and the shape of the focal spots are different from those expected due to the laser mode and the wavefront aberration, it minimally affects the measurement result because of the above-described reasons.

(e) Lens characteristics: Even when the transmittance of the lens used in the measurement system is low, its effects are included in both of the power ratios α and $\beta_k$, so the measurement result is not affected. Although the distortion of the focal spots due to on-axis aberrations is also not a problem, a countermeasure is necessary if there are off-axis aberrations, that is, dependency on the incidence angle. In such a case, the dependency on the incidence angle is measured in advance, and $\beta_k$ is corrected by using the measured value as a correction value. More specifically, a reflective mirror is placed in front of the converging lens in place of the DOE, and the dependency $\alpha(\theta) = q_1/Q$ of the power ratio on the incidence angle is measured while changing the angle θ of the laser beam which is incident on the converging lens by using the reflective mirror. The dependency of the power ratio on the incidence angle is normalized by using the power ratio $\alpha(0)$ corresponding to $\theta = 0°$ to obtain the correction factor $\gamma(\theta) = \alpha(\theta)/\alpha(0)$. Then, the power ratio of each split beam $\beta_k' = q_k/Q$ obtained when the DOE is set, is divided by the correction factor $\gamma(\theta_k)$ corresponding to the diffraction angle $\theta_k$ of each split beam, so the corrected power ratio $\beta_k' = \beta_k/\gamma(\theta_k)$ is obtained.

A similar correction is also possible in the case in which the transmittance depends on the incidence angle. When the fsinθ lens designed and manufactured for large incidence angles is used, the aberrations for beams having large diffraction angles are also corrected, so that the problem due to the aberrations does not occur. Such an fsinθ lens can improve the positional accuracy of the focal spots, and is an ideal lens.

Figure 2:
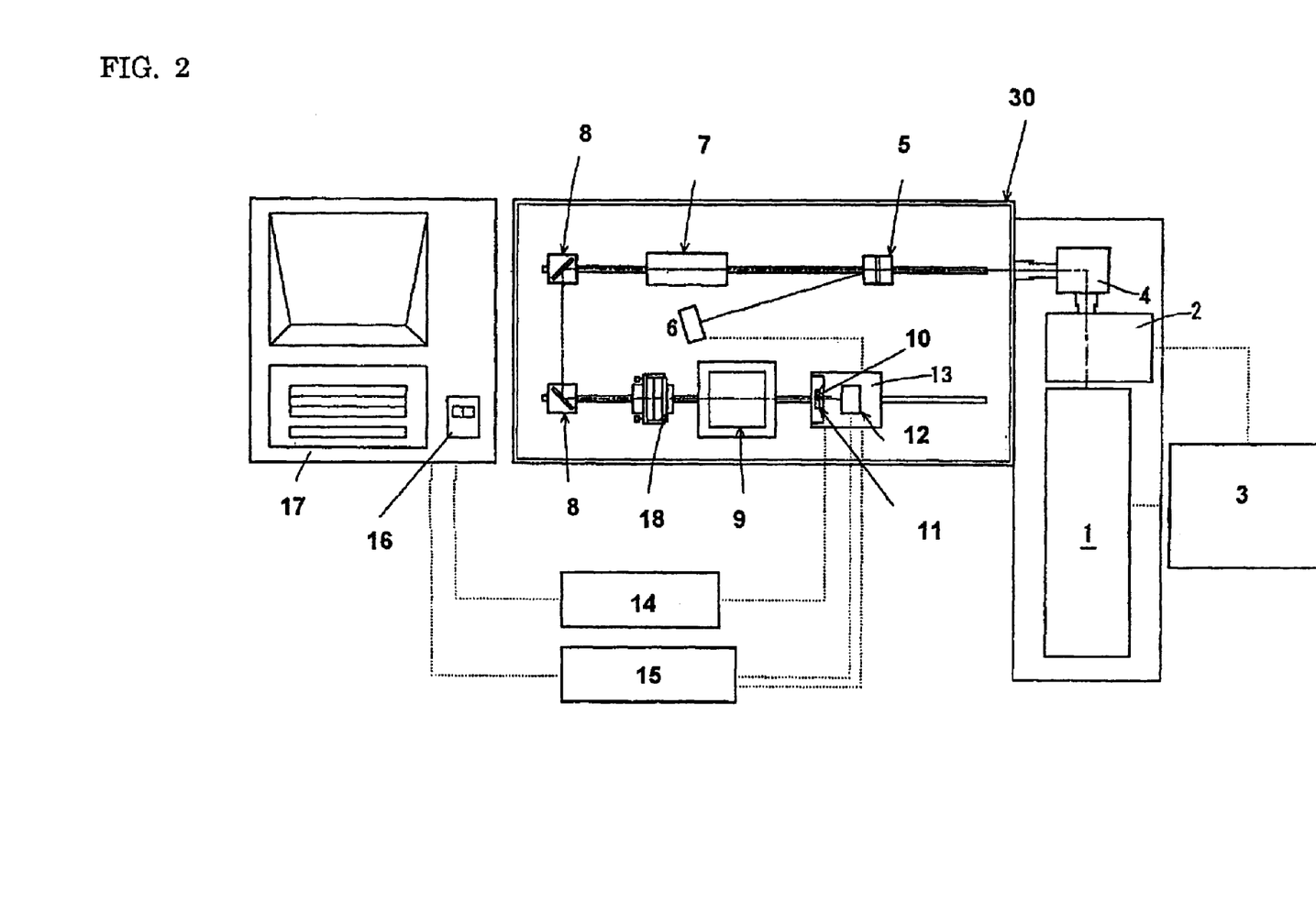
FIG. 2 is a diagram showing the overall construction of the measurement apparatus.

FIG. 2 is a diagram showing the overall construction of the measurement apparatus. With reference to the figure, the measurement apparatus includes a $CO_2$ laser source 1 including a power source, a shutter 2 for switching the guide light, a control panel 3 for the $CO_2$ laser source 1 and the shutter 2, a mirror box 4 for changing the direction of the laser beam, the beam-splitting means (beam sampler) 5, the first detector 6, a zoom expander 7, two bent mirrors 8, the DOE 18, the converging lens 9 (fsinθ lens in the figure), the mask 10 with the pinhole, the water-cooled damper 11 on which the mask 10 is mounted, the second detector 12, a three-axis automatic stage 13 for moving the second detector 12, the damper 11, and the mask 10, a controller 14 for the three-axis automatic-control slide stage 13, an indicator 15 of the measured power, and a personal computer 17 with an interface board 16.

In FIG. 2, the laser beam is emitted from the $CO_2$ laser source 1, enters a test-piece chamber 30, and is split into a main beam and a reference beam by the beam sampler 5. The power of the reference beam is measured by the first detector 6. The main beam passes through the zoom expander 7 where the diameter of the main beam is increased, is reflected by the bent mirrors 8, and enters the DOE 18. Then, the split beams are converged by the converging lens 9 (this may be a single lens). The mask 10 is moved by the three-axis automatic stage 13, and the power of each split beam that has passed through the pinhole in the mask 10 is measured by the second detector 12. The automatic stage 13 and the power meter of the second detector 12 are controlled by the personal computer 17, and the entire measurement process including stage movement and the power measurement can be performed automatically. In the automatic measurement, the automatic adjustment of the pinhole is also performed, as described below.

In the automatic measurement, when the coordinates of the focal points of the split beams on the image plane to be measured are determined, the pinhole is moved vertically and horizontally at a predetermined pitch (for example, 10 μm) in a predetermined area centered on the determined coordinates while measuring the power ratio at each position. Then, at the position where the maximum power ratio is obtained, the mask is moved along the optical axis and the coordinate along the optical axis where the maximum power ratio is obtained, is determined. The result is output in a list. This process is automatically repeated at each of the focal points of the split beams.

Figure 3:
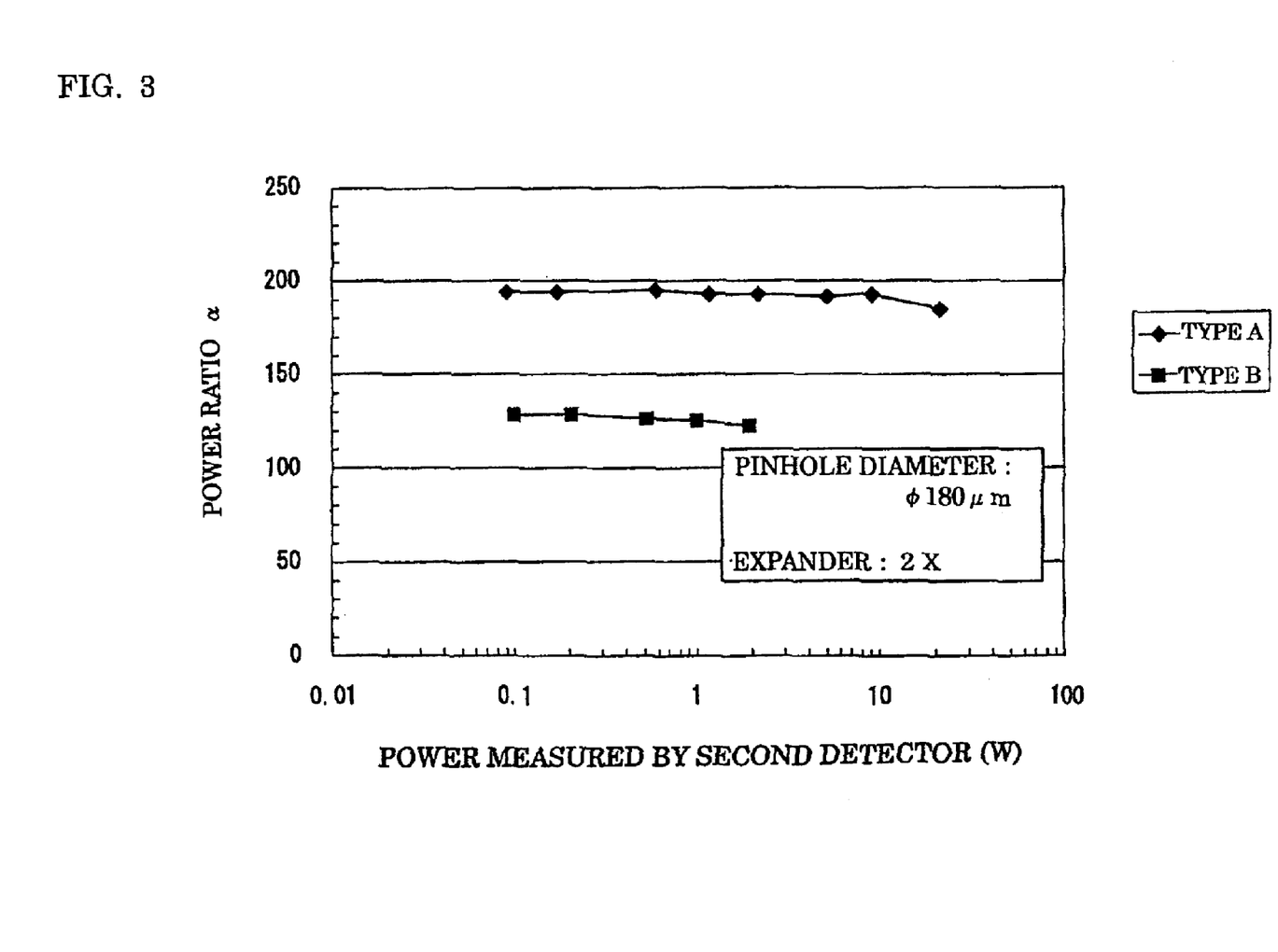
FIG. 3 is a diagram showing the verification result of the power-ratio measurement accuracy.

FIG. 3 shows the results of a measurement of the power ratio α that was performed without the DOE to verify the accuracy of the above-described measurement apparatus. The power of the laser apparatus was varied in a range such that the power value of the second detector 12 varied in the range of 0.1 W to 20 W, and α was measured ten times for each power value. The average value of α is plotted in FIG. 3. Two types of detectors were prepared as the second detector 12: Type A whose measurement range was up to 30 W, and Type B whose measurement range was up to 2 W. Since the laser output was varied in a wide range from several hundred mW to over 20 W, the degree of power variation was large and the measurement values of the first and second detectors were varied ±10% to ±30%. However, as shown in FIG. 3, for both detectors of Type A and Type B, the measured power ratio α was nearly constant for all the power values. The average of all α which was measured ten times for each power value and the deviation (2σ) thereof were α=191.7±3.7% for the detector of Type A and α=125.8±3.1% for the detector of Type B. Accordingly, the target accuracy of less than ±5% was achieved. The reason why the value of α obtained by the detector of Type A and that obtained by the detector of Type B are different from each other is because these detectors have different structures (the size of the light-receiving surface, the distance from the pinhole, etc.). From this result, it has been confirmed that the measurement accuracy of the above-described measurement apparatus is sufficiently high.

Next, the result of a measurement of the diffraction efficiency and the intensity uniformity of the split beams of the DOE performed by using the measurement apparatus shown in FIG. 2 will be described below.

Figure 4:
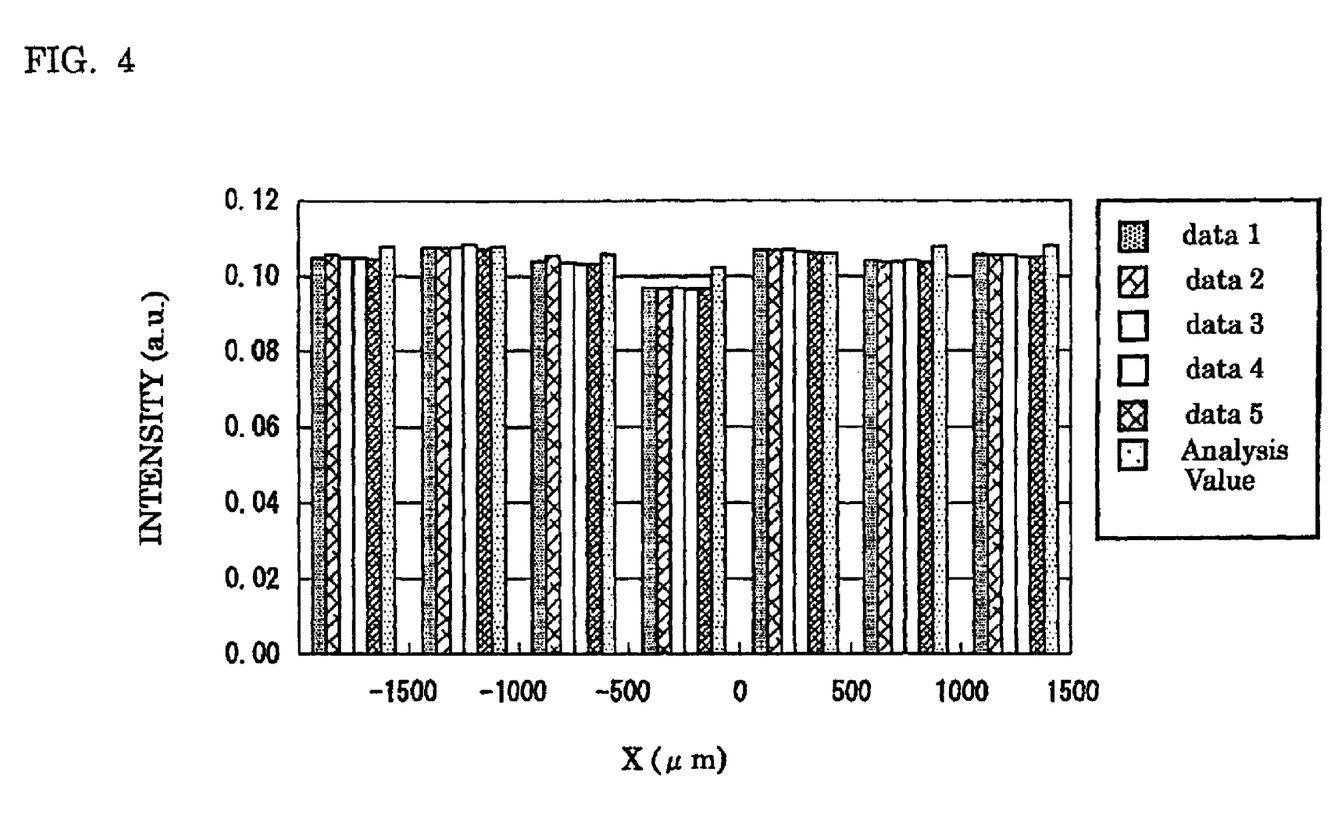
FIG. 4 is a diagram showing the measurement result and the simulation analysis result of a DOE whose splitting number is seven.

First, the measurement result of a binary phase DOE whose splitting number is seven will be described. In this case, a meniscus aspherical lens whose focal length was 5 inches (127 mm) and diameter was 2 inches (50.8 mmφ) was used. The pitch of the focal points was 0.5 mm. Other conditions were such that the expander magnification was 2, the pinhole diameter was 280 μmφ, and the detector of Type A was used as the second detector 12. FIG. 4 shows the result of five measurements and the results of analysis (the simulation result of the influence of line width error and etching depth error occurred in the microfabrication of the DOE). The intensities of seven split beams are plotted in a bar graph shown in FIG. 4. As is apparent from FIG. 4, the values obtained by the five measurements are almost constant, and the distribution pattern of the measured values is similar to that of the analysis values. In particular, as has been predicted by the simulation, the fact that the intensity of the zero-order split beam at the center is lower than the intensities of other split beams due to the line width error can be confirmed by the measurement results. The analysis value of the diffraction efficiency was 74.3%, and the measurement result thereof was 72.7%±0.3%. In addition, the analysis value of the intensity uniformity (σ) of the split beams was 1.7% and the measurement result thereof was 3.0%, which was relatively larger than the analysis value.

In addition, measurements for a sixteen-level phase DOE whose splitting number was 7×7=49 were also performed under the same conditions as the above-described case where the DOE whose splitting number was seven, was used. Also in this case, the distribution pattern of the intensities of the split beams obtained by the analysis result (where line width error and etching depth error were taken into account) and that obtained by the measurement results were extremely similar to each other. The analysis value of the diffraction efficiency was 88.5%, and the measurement result thereof was 87.8%. In addition, the analysis value of the intensity uniformity (σ) of the split beams was 5.3% and the measurement result thereof was 8.0%.

Figure 5:
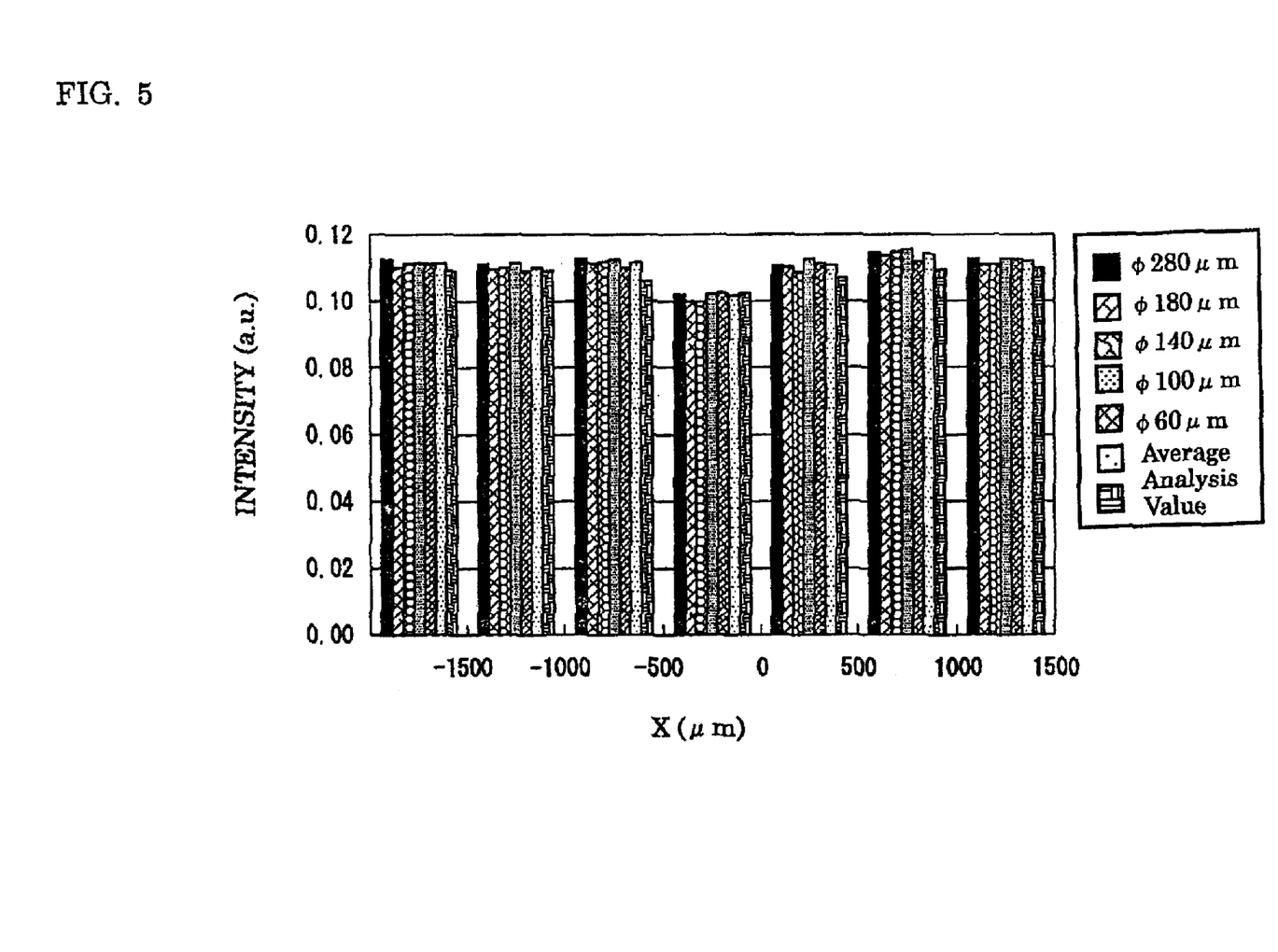
FIG. 5 is a diagram showing the examination result of a dependency of split-beam intensity on a pinhole size.

Next, the dependency of the intensities of the split beams on the pinhole size was investigated. FIG. 5 shows the measurement results of the intensities of the split beams when the diameter of the pinhole was set to 60 μm, 100 μm, 140 μm, 180 μm, and 280 μm. As is apparent from FIG. 5, the measurement results did not change even when the pinhole size was changed.

Figure 6:
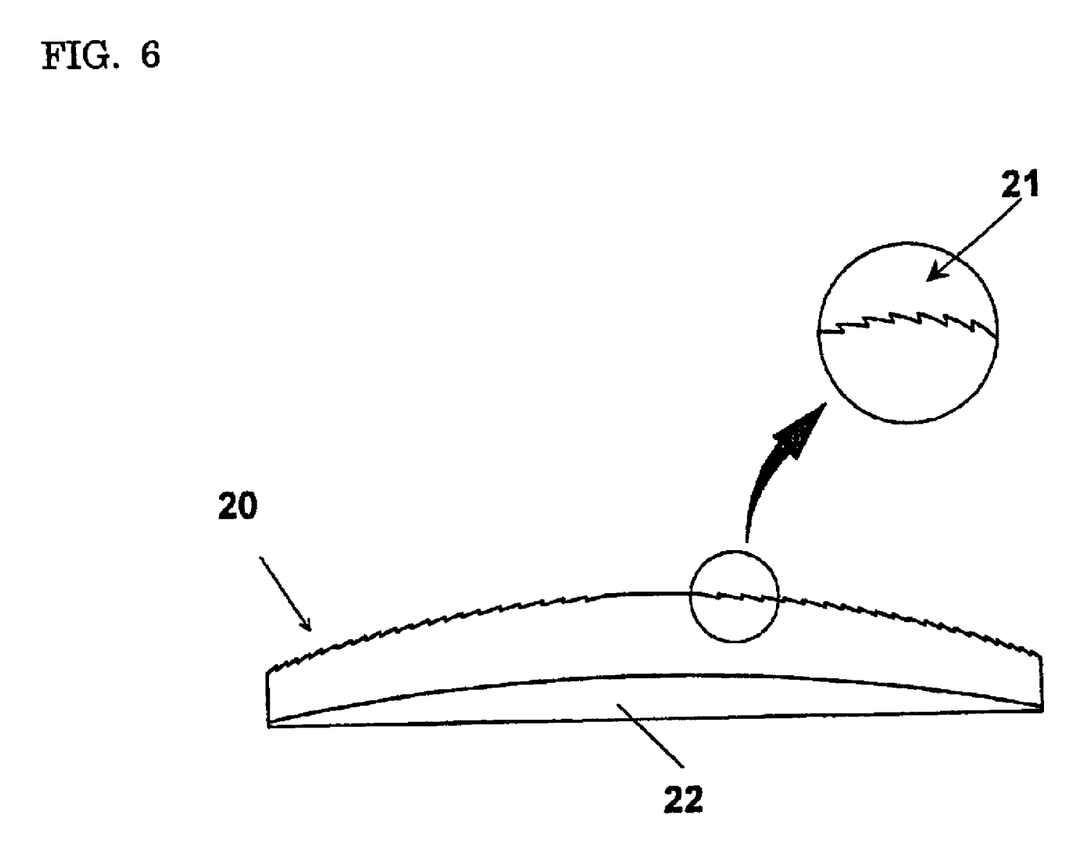
FIG. 6 is a diagram showing the construction of a hybrid lens.
Figure 10:
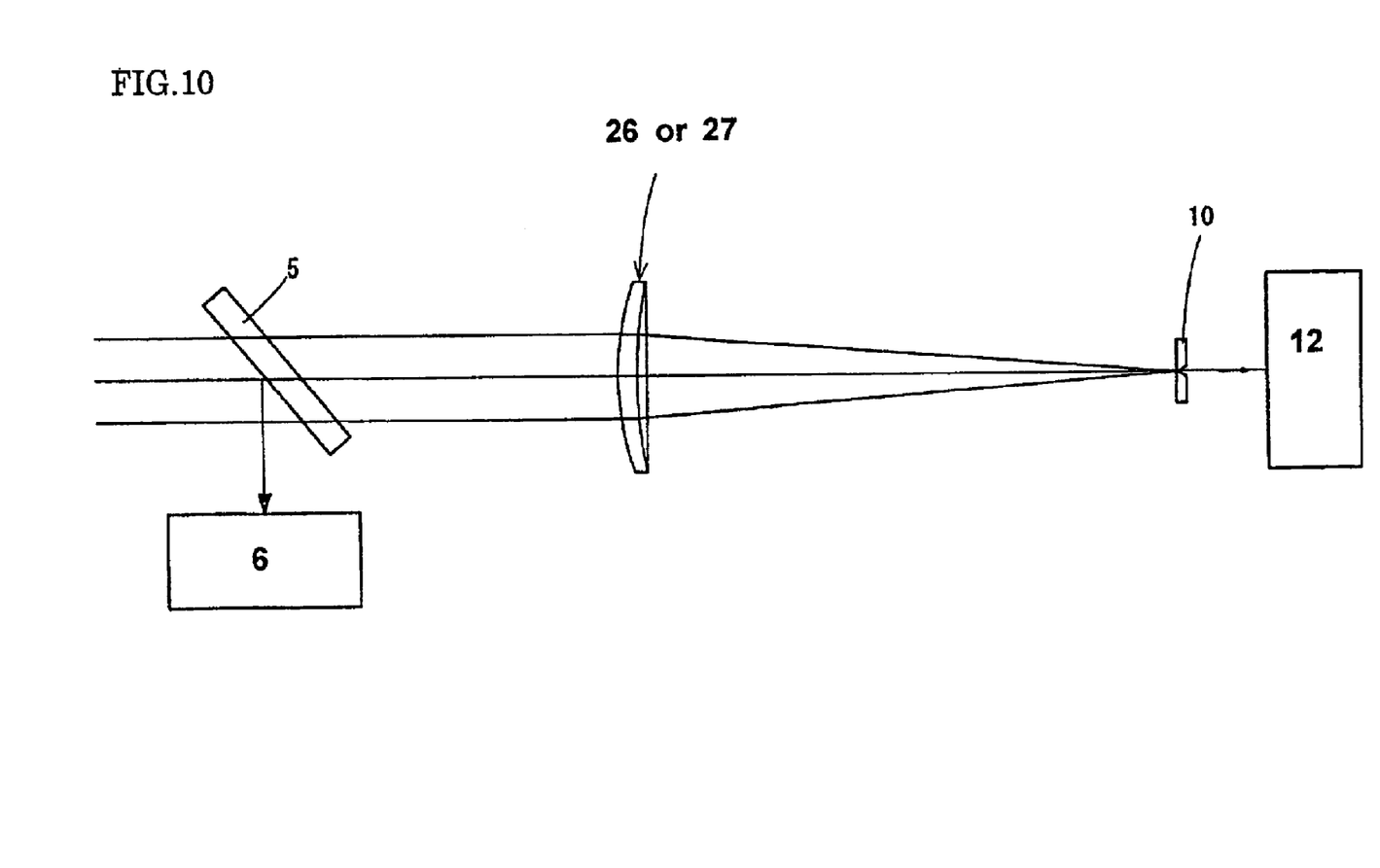
FIG. 10 is a diagram showing the manner in which optical properties of the hybrid lens are measured.

FIG. 6 shows a hybrid lens 22 which has an aspheric surface 20 and a brazed surface-relief microstructure 21 on the aspheric surface, and they realize functions of refraction and diffraction, respectively. The focal length of the hybrid lens is 127 mm, and the diameter thereof is 50.8 mm. In addition, the hybrid lens is composed of zinc selenide (ZnSe). The diffraction efficiency of this hybrid lens was measured by the following steps:

First step: An aspheric lens 26 (reference lens) having the same focal length (127 mm) as the hybrid lens (DOE) was set in the measurement apparatus as shown in FIG. 10, and the reference power ratio α=$q_1$/Q was determined.

Second step: The hybrid lens 27 was set in place of the aspheric lens 26 and the power ratio $α_1$=$q_1$/Q was determined.

As described above, the converging lens 9 is not used in this case. In addition, the hybrid lens 27 used in this case is a converging lens and does not have the beam-splitting function, so while the power ratio determined at the second step is only $β_1$. Accordingly, although the main target of the measurement apparatus and the measurement method is beam-splitting DOEs, it can of course be used for measuring optical properties of light-converging DOEs having no beam-splitting function (Fresnel lenses, hybrid lenses, etc.).

The diffraction efficiency η=$β_1$/α was calculated from the results obtained at the first and the second steps; η=97.3% was obtained for Sample 1 and η=98.6% for Sample 2. The diffraction efficiency of a Fresnel lens (where a surface-relief microstructure is formed on a flat surface) may also be obtained in a similar manner.

Figure 7:
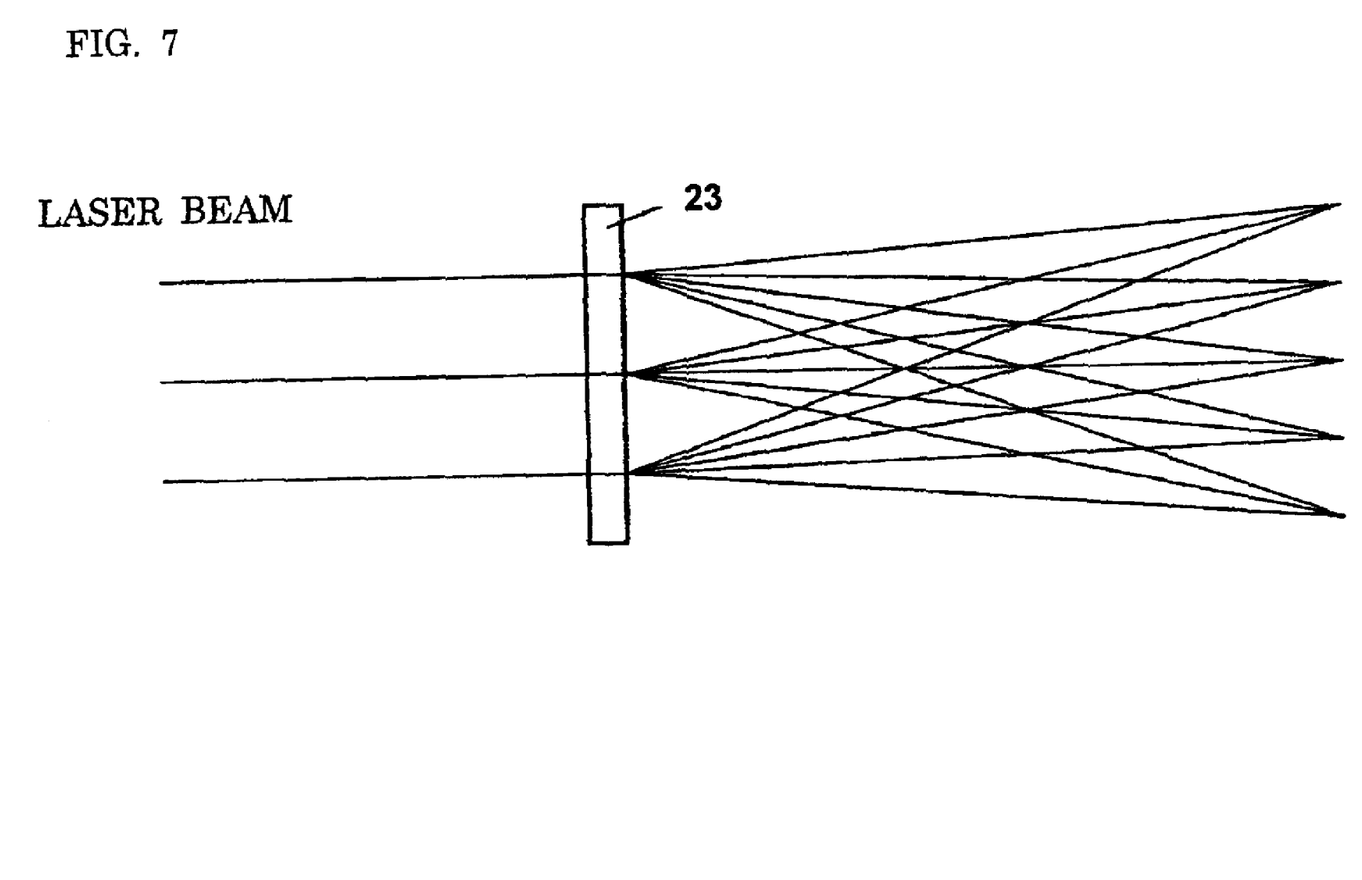
FIG. 7 is a diagram showing the manner in which a Fresnel DOE splits a laser beam and the split beams converge.

The optical properties of a Fresnel DOE were measured by using the measurement apparatus shown in FIG. 2. As shown in FIG. 7, the Fresnel DOE 23 has both the beam-splitting function and the light-converging function. The focal length of the Fresnel DOE 23 was 254 mm, the number of focal spots was 7×7=49, and the spot pitch was 1 mm. In addition, the Fresnel DOE 23 was made of ZnSe.

Figure 8:
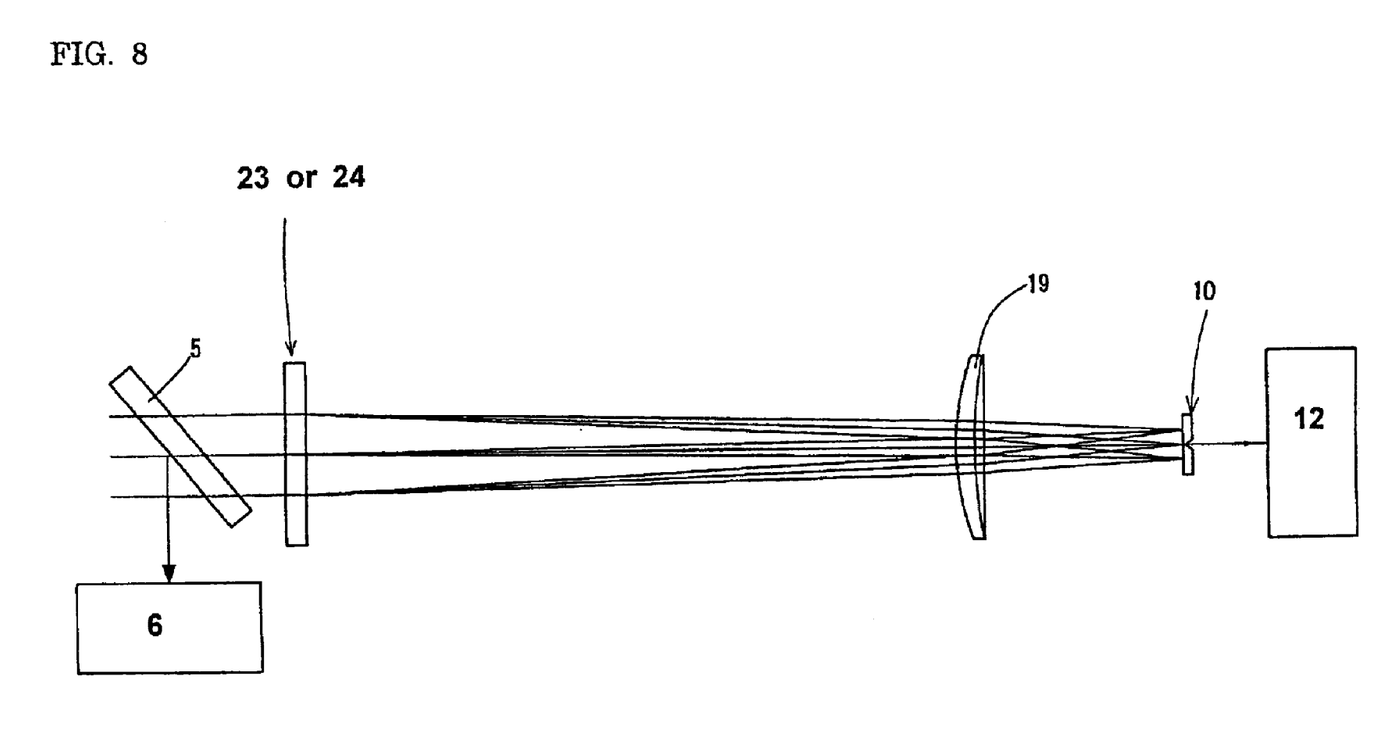
FIG. 8 is a diagram showing the manner in which optical properties of the Fresnel DOE are measured.

As shown in FIG. 8, the fsinθ lens 9 in the measurement apparatus shown in FIG. 2 was replaced by a meniscus aspherical lens 19, and a reference lens 24 or the Fresnel DOE 23 was placed at the front focal point of the lens 19. The measurement was performed by the following steps:

First step: A plano-convex lens (reference lens 24) made of ZnSe having the same focal length (254 mm) as the Fresnel DOE 23 was set and the reference power ratio $\alpha=q_1/Q$ was determined.

Second step: The Fresnel DOE 23 was set in place of the plano-convex lens and the power ratio $\beta_k=q_k/Q$ of each split beam was determined.

Then, the diffraction efficiency η and the intensity uniformity σ of the split beams were calculated from Eq. (1) to (4). As a result, η=71.7% and σ=3.9% were obtained for Sample 1 and η=72.1% and σ=3.7% were obtained for Sample 2. Since the Fresnel DOE 23 also have the light-converging function, it is possible to thereby perform measurement without a converging lens as shown in FIG. 10.

Although in the above described examples the optical properties of DOEs for $CO_2$ lasers are determined by using a $CO_2$ laser, a similar measurement apparatus may also be constructed for DOEs for other lasers (YAG lasers, etc.) using the corresponding laser and optical components therefor (mirrors, converging lenses, etc.), and the optical properties can be measured by a similar method. In such a case, the effects of the present invention also can be obtained.

What is claimed is:

1. An apparatus for measuring optical properties of a diffractive optical element, comprising:
    a laser source which emits a laser beam;
    beam-splitting means of splitting the laser beam into a main beam and a reference beam;
    first measuring means of measuring the power or the energy of the reference beam;
    a test piece which splits the main beam into a plurality of split beams;
    a mask which allows one of the split beams to pass therethrough;
    mask-moving means of moving the mask along at least two axial directions in a plane perpendicular to an optical axis;
    second measuring means of measuring the power or the energy of the split beam that has passed through the mask; and
    calculating means of calculating the ratio of the power or the energy measured by the first measuring means to the power or the energy measured by the second measuring means.

2. An apparatus for measuring optical properties of a diffractive optical element according to claim 1, further comprising a converging lens which is disposed in the rear of the test piece.

3. An apparatus for measuring optical properties of a diffractive optical element according to claim 2, wherein the test piece is placed at the front focal point of the converging lens.

4. An apparatus for measuring optical properties of a diffractive optical element according to claim 2, wherein the converging lens is an fsinθ lens.

5. An apparatus for measuring optical properties of a diffractive optical element according to claim 3, wherein the converging lens is an fsinθ lens.

6. A method of measuring optical properties of a diffractive optical element by using the apparatus according to claim 1, comprising the steps of:
    calculating a power ratio $\alpha=q_1/Q$, where Q is the power measured by the first measuring means and $q_1$ is the power measured by the second measuring means, in the state in which a reference lens having the same focal length as that of the test piece is set in place of the test piece; and
    setting the test piece and calculating a power ratio $\beta_k=q_k/Q$ for each split beam, where $q_k$ is the power of each split beam measured by the second measuring means, in the state in which the test piece is set.

7. A method of measuring optical properties of a diffractive optical element by using the apparatus according to claim 2, comprising the steps of:
    calculating a power ratio $\alpha=q_1/Q$, where Q is the power measured by the first measuring means and $q_1$ is the power measured by the second measuring means, in the state in which the test piece is not set or a reference lens having the same focal length as that of the test piece is set in place of the test piece; and
    setting the test piece and calculating a power ratio $\beta_k=q_k/Q$ for each split beam, where $q_k$ is the power of each split beam measured by the second measuring means, in the state in which the test piece is set.

8. A method of measuring optical properties of a diffractive optical element by using the apparatus according to claim 3, comprising the steps of:
    calculating a power ratio $\alpha=q_1/Q$, where Q is the power measured by the first measuring means and $q_1$ is the power measured by the second measuring means, in the state in which the test piece is not set or a reference lens having the same focal length as that of the test piece is set in place of the test piece; and
    setting the test piece and calculating a power ratio $\beta_k=q_k/Q$ for each split beam, where $q_k$ is the power of each split beam measured by the second measuring means, in the state in which the test piece is set.

9. A method of measuring optical properties of a diffractive optical element by using the apparatus according to claim 2, comprising the steps of:
    disposing a reflective mirror in front of the converging lens in place of the test piece, determining the dependency $\alpha(\theta)=q_1/Q$ of the power ratio on an incidence angle θ of the laser beam incident on the converging lens, where Q is the power measured by the first measuring means and $q_1$ is the power measured by the second measuring means, while changing the incidence angle θ with the reflective mirror, and normalizing the determined dependency by α(0) to obtain a correction factor $\gamma(\theta)=\alpha(\theta)/\alpha(0)$;
    calculating a power ratio $\alpha=q_1/Q$ in the state in which the test piece is not set or a reference lens having the same focal length as that of the test piece is set in place of the test piece; and
    setting the test piece, calculating a power ratio $\beta_k=q_k/Q$ for each split beam, where $q_k$ is the power of each split beam measured by the second measuring means, in the state in which the test piece is set, and dividing the power ratio $\beta_k$ by the correction factor $\gamma(\theta_k)$ corresponding to the diffraction angle $\theta_k$ of each split beam to obtain a corrected power ratio $\beta_k'=\beta_k/\gamma(\theta_k)$.

10. A method of measuring optical properties of a diffractive optical element by using the apparatus according to claim 3, comprising the steps of:

disposing a reflective mirror in front of the converging lens in place of the test piece, determining the dependency $\alpha(\theta)=q_1/Q$ of the power ratio on an incidence angle $\theta$ of the laser beam incident on the converging lens, where $Q$ is the power measured by the first measuring means and $q_1$ is the power measured by the second measuring means, while changing the incidence angle $\theta$ with the reflective mirror, and normalizing the determined dependency by $\alpha(0)$ to obtain a correction factor $\gamma(\theta)=\alpha(\theta)/\alpha(0)$;

calculating a power ratio $\alpha=q_1/Q$ in the state in which the test piece is not set or a reference lens having the same focal length as that of the test piece is set in place of the test piece; and setting the test piece, calculating a power ratio $\beta_k=q_k/Q$ for each split beam, where $q_k$ is the power of each split beam measured by the second measuring means, in the state in which the test piece is set, and dividing the power ratio $\beta_k$ by the correction factor $\gamma(\theta_k)$ corresponding to the diffraction angle $\theta_k$ of each split beam to obtain a corrected power ratio $\beta_k'=\beta_k/\gamma(\theta_k)$.

\* \* \* \* \*